(12) United States Patent
Morino et al.

(10) Patent No.: US 9,191,590 B2
(45) Date of Patent: Nov. 17, 2015

(54) SIGNAL PROCESSING DEVICE AND IMAGING SYSTEM

(71) Applicant: Kabushiki Kaisha Toshiba, Minato-ku (JP)

(72) Inventors: Hiroaki Morino, Arakawa-ku (JP); Naoki Ozaki, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 125 days.

(21) Appl. No.: 14/193,205

(22) Filed: Feb. 28, 2014

(65) Prior Publication Data

US 2015/0163424 A1    Jun. 11, 2015

(30) Foreign Application Priority Data

Dec. 5, 2013    (JP) .................................. 2013-252058

(51) Int. Cl.
*H04N 5/361* (2011.01)
*H04N 5/374* (2011.01)

(52) U.S. Cl.
CPC .............. *H04N 5/361* (2013.01); *H04N 5/374* (2013.01)

(58) Field of Classification Search
CPC ...................................................... H04N 5/361
USPC ............................................ 348/243, 222.1
See application file for complete search history.

(56) References Cited

U.S. PATENT DOCUMENTS

| 2007/0126886 A1* | 6/2007 | Sakurai ................ H04N 5/3575 |
| | | 348/222.1 |
| 2009/0040328 A1* | 2/2009 | Suzuki .................... H04N 5/361 |
| | | 348/222.1 |
| 2013/0010166 A1 | 1/2013 | Morisaki et al. |

FOREIGN PATENT DOCUMENTS

| JP | 2004-80168 | 3/2004 |
| JP | 2006-14364 | 1/2006 |
| JP | 2013-17040 | 1/2013 |
| KR | 10-2007-0058339 A | 6/2007 |
| KR | 10-2008-0101698 A | 11/2008 |

OTHER PUBLICATIONS

Office Action issued on Feb. 9, 2015 in Korean Patent Application No. 10-2014-0023529 with English translation.

\* cited by examiner

*Primary Examiner* — Joel Fosselman
(74) *Attorney, Agent, or Firm* — Oblon, McClelland, Maier & Neustadt, L.L.P.

(57) ABSTRACT

According to one embodiment, there is provided a signal processing device that processes a signal output from an imaging sensor. The device includes a lead integration unit, a main integration unit, and a correction unit. The lead integration unit integrates and averages, in a first integration region, signals of a plurality of first light-shielded pixels in a light-shielded area. The main integration unit integrates and averages, in a second integration region that is determined based on a result integrated and averaged by the lead integration unit, signals of a plurality of second light-shielded pixels in the light-shielded area. The correction unit determines a reference black level based on a result integrated and averaged by the main integration unit and corrects a black level of a signal of a light receiving pixel using the determined reference black level.

20 Claims, 10 Drawing Sheets

FIG.10
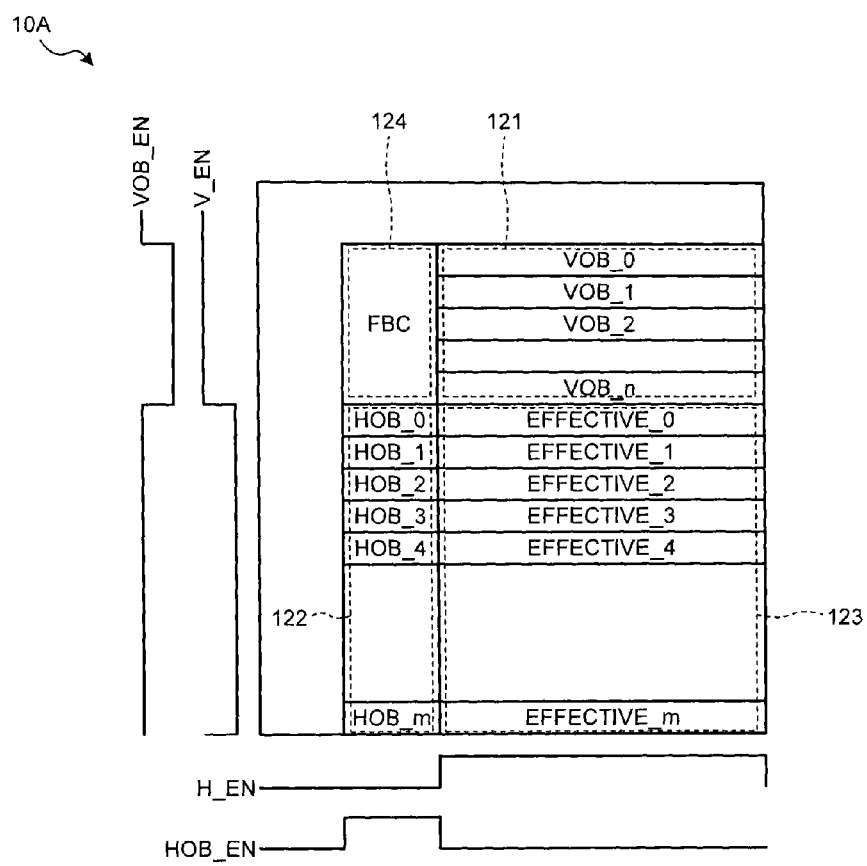
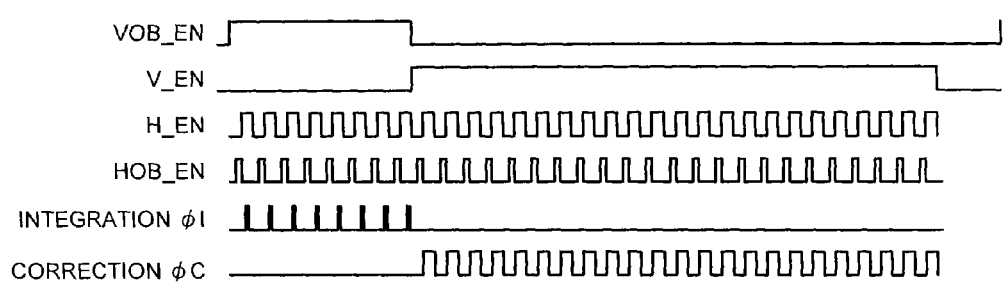

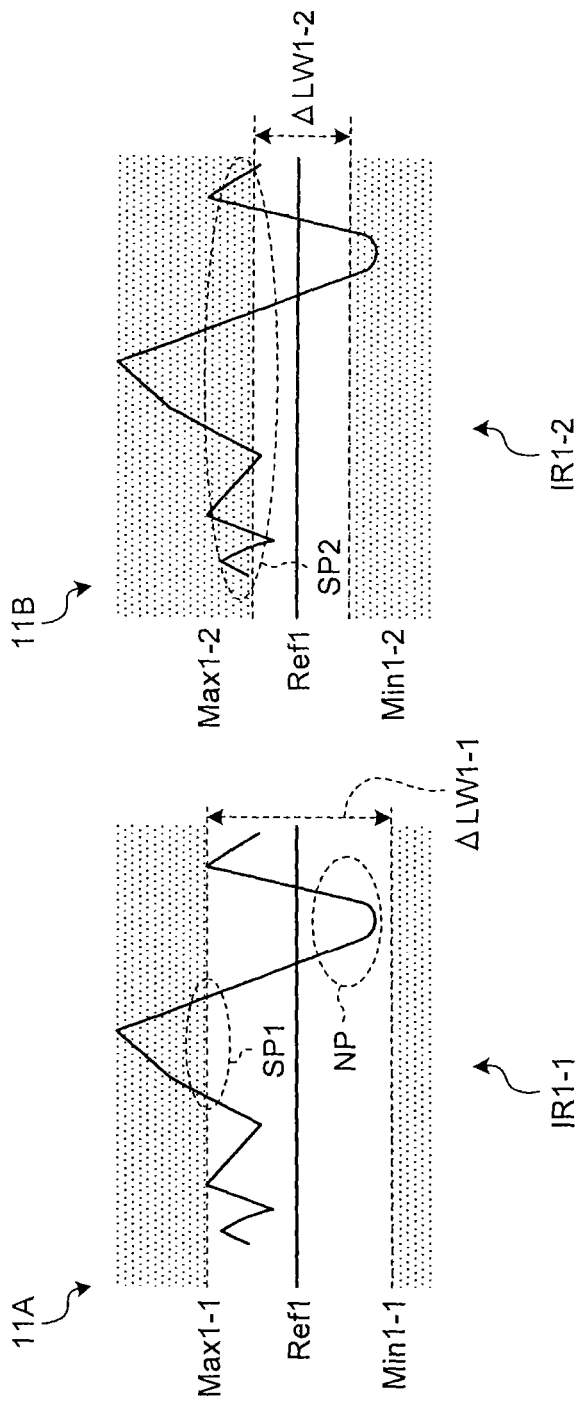

SIGNAL PROCESSING DEVICE AND IMAGING SYSTEM

CROSS-REFERENCE TO RELATED APPLICATIONS

This application is based upon and claims the benefit of priority from Japanese Patent Application No. 2013-252058, filed on Dec. 5, 2013; the entire contents of which are incorporated herein by reference.

FIELD

Embodiments described herein relate generally to a signal processing device and an imaging system.

BACKGROUND

In an imaging sensor such as a CMOS image sensor, a signal obtained from a light receiving pixel may include noise due to a dark current, so that the black level of the signal of the light receiving pixel is deviated from an ideal level. When the black level of the signal of the light receiving pixel is deviated from the ideal level, white floating or black sinking may be generated in a picture corresponding to signals of a plurality of light receiving pixels. Therefore, it is desired to correct the black level of the signal of the light receiving pixel with high accuracy.

BRIEF DESCRIPTION OF THE DRAWINGS

FIGS. 10A and 10B illustrate an operation of an OB clamp circuit according to the basic mode; and FIGS. 11A and 11B illustrate the operation of the OB clamp circuit according to the basic mode.

DETAILED DESCRIPTION

In general, according to one embodiment, there is provided a signal processing device that processes a signal output from an imaging sensor that includes a light receiving area in which a plurality of light receiving pixels is arranged and a light-shielded area in which a plurality of light-shielded pixels is arranged. The device includes a lead integration unit, a main integration unit, and a correction unit. The lead integration unit integrates and averages, in a first integration region, signals of a plurality of first light-shielded pixels in the light-shielded area. The main integration unit integrates and averages, in a second integration region that is determined based on a result integrated and averaged by the lead integration unit, signals of a plurality of second light-shielded pixels in the light-shielded area. The correction unit determines a reference black level based on a result integrated and averaged by the main integration unit and corrects a black level of a signal of a light receiving pixel using the determined reference black level.

Exemplary embodiments of a signal processing device will be explained below in detail with reference to the accompanying drawings. The present invention is not limited to the following embodiments.

Embodiment

Figure 5:
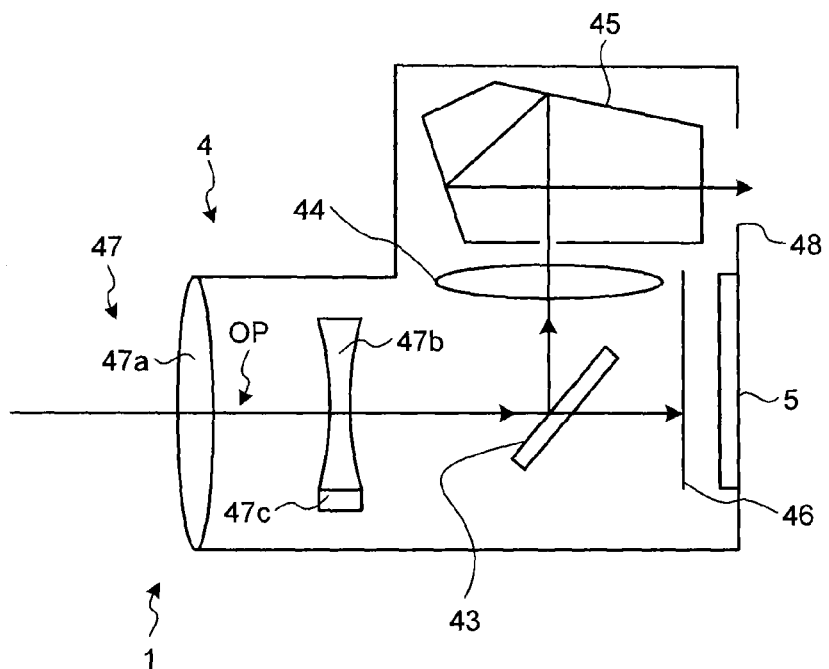
FIG. 5 illustrates a configuration of an imaging system in which a solid imaging device according to a basic mode is applied.
Figure 6:
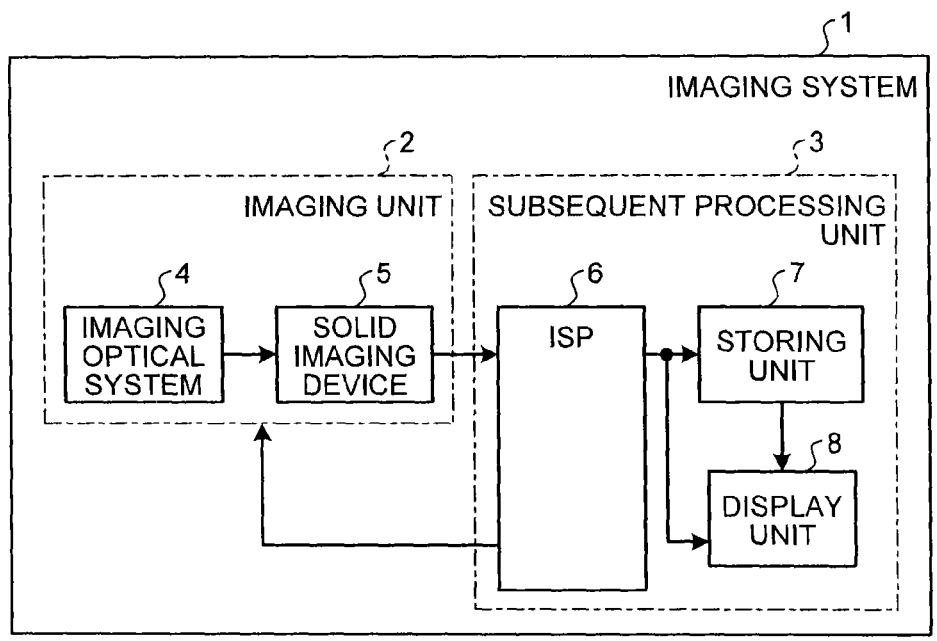
FIG. 6 illustrates a configuration of the imaging system in which the solid imaging device according to the basic mode is applied.

Before explaining a solid imaging device 5i according to an embodiment, a solid imaging device 5 according to a basic mode is explained. The solid imaging device 5 is applied, for example, to an imaging system 1 shown in FIGS. 5 and 6. FIGS. 5 and 6 illustrate schematic configurations of the imaging system 1.

The imaging system 1 may be, for example, a digital camera, a digital video camera, or may be an electronic device including a camera module (for example, a mobile terminal equipped with a camera). As shown in FIG. 6, the imaging system 1 includes an imaging unit 2 and a subsequent processing unit 3. The imaging unit 2 is, for example, a camera module. The imaging unit 2 includes an imaging optical system 4 and the solid imaging device 5. The subsequent processing unit 3 includes an ISP (Image Signal Processor) 6, a storing unit 7, and a display unit 8.

The imaging optical system 4 includes an imaging lens 47, a half mirror 43, a mechanical shutter 46, a lens 44, a prism 45, and a finder 48. The imaging lens 47 includes imaging lenses 47a and 47b, an aperture (not shown), and a lens driving mechanism 47c. The aperture is arranged between the imaging lens 47a and the imaging lens 47b, and adjusts the amount of light guided to the imaging lens 47b. Although a case where the imaging lens 47 includes the two imaging lenses 47a and 47b is shown in FIG. 5 as an example, the imaging lens 47 may include more imaging lenses.

The solid imaging device 5 is arranged on a planned imaging surface of the imaging lens 47. For example, the imaging lens 47 refracts incident light and guides the light to an imaging surface of the solid imaging device 5 via the half mirror 43 and the mechanical shutter 46, to form an image of an object on the imaging surface (a pixel array 12) of the solid imaging device 5. The solid imaging device 5 generates a picture signal corresponding to the image of the object.

Figure 7:
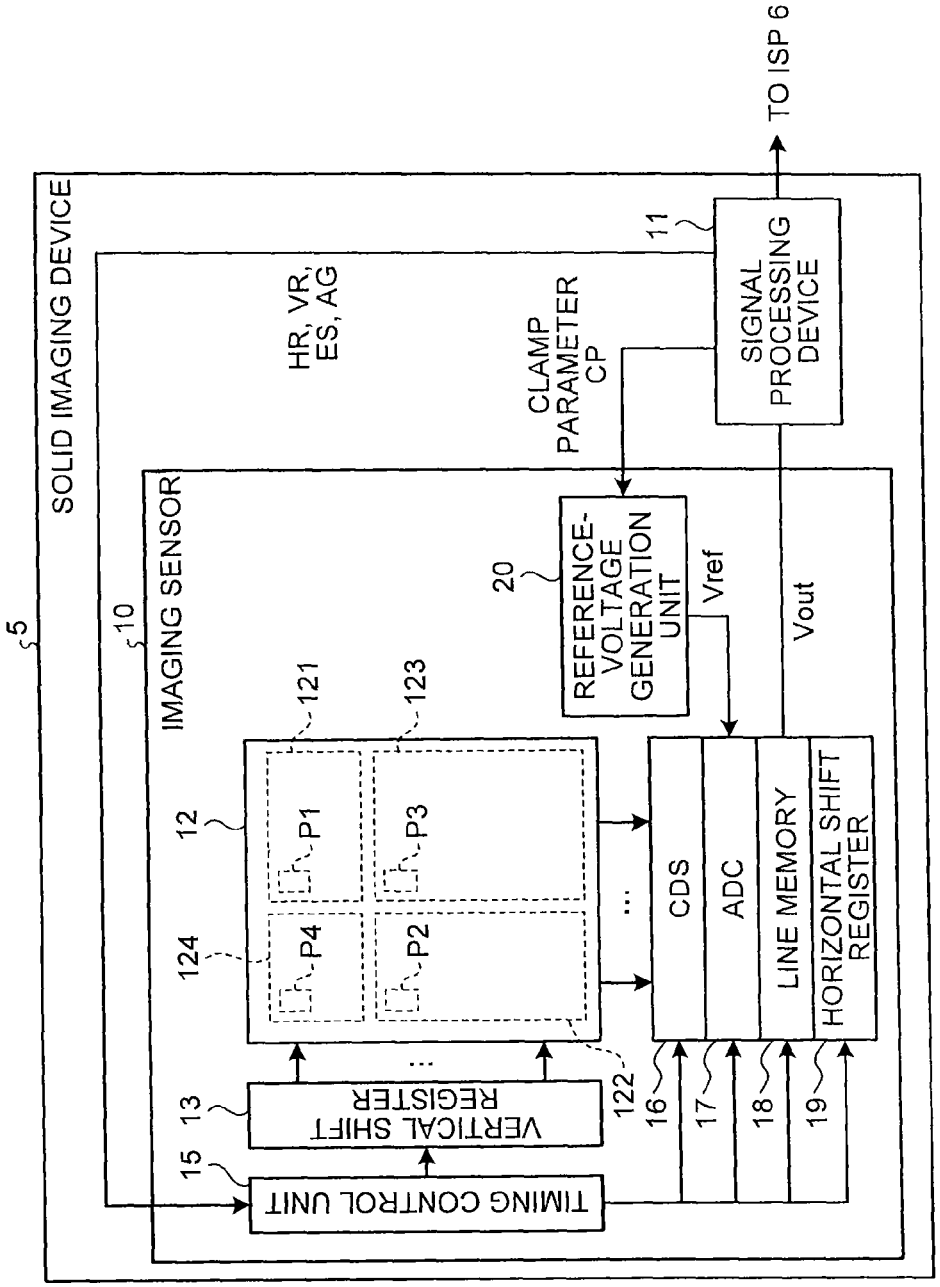
FIG. 7 illustrates a circuit configuration of an imaging sensor according to the basic mode.

As shown in FIG. 7, the solid imaging device 5 includes an imaging sensor 10 and a signal processing device 11. FIG. 7 illustrates a circuit configuration of the solid imaging device 5. The imaging sensor 10 may be, for example, a CMOS image sensor or a CCD image sensor. The imaging sensor 10 includes the pixel array 12, a vertical shift register 13, a timing control unit 15, a correlated double sampling unit (CDS circuit) 16, an analog-to-digital conversion unit (ADC circuit) 17, a line memory 18, a horizontal shift register 19, and a reference-voltage generation unit 20.

In the pixel array 12, a plurality of pixels is two-dimensionally arranged. Each of the pixels includes an photoelectric conversion unit. The photoelectric conversion unit is, for example, a photodiode that generates a pixel signal corresponding to the incident light amount. That is, the pixel array 12 generates a picture signal (an analog signal) corresponding to the amount of received light on each of the pixels. The generated picture signal is read out from pixels P to the CDS circuit 16 by the timing control unit 15 and the vertical shift register 13, is converted into a picture signal (a digital signal) through the CDS circuit 16 and the ADC circuit 17, and stored in the line memory 18. At this time, the ADC circuit 17 performs an AD conversion by using a slope voltage supplied from the reference-voltage generation unit 20. Pixel signals (Vout) of each column stored in the line memory 18 are sequentially selected and output to the signal processing device 11 by the horizontal shift register 19. In the signal processing device 11, signal processing is performed on the picture signal, to generate picture data. The generated picture data is output to the ISP 6.

The lens driving mechanism 47c shown in FIG. 5 drives the imaging lens 47b along an optical axis OP under the control of the ISP 6 (see FIG. 6). For example, the ISP 6 obtains focus adjustment information based on an AF (Auto Focus) function, and controls the lens driving mechanism 47c based on the focus adjustment information, to adjust the imaging lenses 47a and 47b to a focused state (just focused).

In the imaging sensor 10 shown in FIG. 7, the pixel array 12 includes an effective pixel area (light receiving area) 123 for imaging an object. In the effective pixel area 123, a plurality of effective pixels (light receiving pixels) P3 is two-dimensionally arranged. Each of the effective pixels P3 is configured such that at least the photoelectric conversion unit is not light-shielded, so that the photoelectric conversion unit receives the incident light, and configured to output a pixel signal obtained by the photoelectric conversion unit according to the amount of the received light. The signal obtained from the effective pixel P3 may include noise due to a dark current, so that the black level of the signal of the effective pixel P3 occasionally deviates from an ideal level. When the black level of the signal of the effective pixel P3 deviates from the ideal level, white floating or black sinking may be generated in a picture corresponding to signals of the plurality of effective pixels P3.

Therefore, in order to adjust and correct the black level of the signal of the effective pixel P3, the pixel array 12 includes an FBC optical black area (FBC area) 124, a vertical optical black area (VOB area) 121, and a horizontal optical black area (HOB area) 122.

In the FBC optical black area (second light-shielded area) 124, a plurality of light-shielded pixels P4 is arranged, for example, the plurality of light-shielded pixels P4 is two-dimensionally arranged. Each of the light-shielded pixels P4 is configured such that at least the photoelectric conversion unit is light-shielded, for example, the entire light-shielded pixels P4 are light-shielded by an upper-layer light shielding film (for example, a metal film). Each of the light-shielded pixels P4 is configured to output, as a reference signal, a pixel signal obtained by the photoelectric conversion unit in a state of being light-shielded.

In the vertical optical black area (light-shielded area) 121, a plurality of light-shielded pixels P1 is arranged, for example, is arranged two-dimensionally. Each of the light-shielded pixels P1 is configured such that at least the photoelectric conversion unit is light-shielded, for example, the entire light-shielded pixels P1 are light-shielded by an upper-layer light shielding film (for example, a metal film). Each of the light-shielded pixels P1 is configured to output, as a reference signal, a pixel signal obtained by the photoelectric conversion unit in a state of being light-shielded.

Similarly, in the horizontal optical black area 122, a plurality of light-shielded pixels P2 is arranged, for example, the plurality of light-shielded pixels P2 is two-dimensionally arranged. Each of the light-shielded pixels P2 is configured such that at least the photoelectric conversion unit is light-shielded, for example, the entire light-shielded pixels P2 are light-shielded by an upper-layer light shielding film (for example, a metal film). Each of the light-shielded pixels P2 is configured to output, as a reference signal, a pixel signal obtained by the photoelectric conversion unit in a state of being light-shielded.

The vertical shift register 13 shown in FIG. 7 sequentially selects, for example, rows of the pixel array 12 from above in FIG. 7, under the control of the timing control unit 15, and transfers signals of a plurality of pixels included in the selected row to the CDS circuit 16 in parallel. The pixel signals of each column transferred to the CDS circuit 16 are A/D converted by the ADC circuit 17 and stored in the line memory 18, and then transferred to the signal processing device 11. In response thereto, the signal processing device 11 adjusts and corrects the black level of the signal of the effective pixel by using the signal of the light-shielded pixel P4 in the FBC optical black area 124 and the signal in the light-shielded pixel P1 in the vertical optical black area 121.

For example, the signal of the light-shielded pixel P4 in the FBC optical black area 124 is output from the imaging sensor 10 ahead of the signal of the light-shielded pixel P1 in the vertical optical black area 121. In response thereto, the signal processing device 11 adjusts the black level of the signal of the effective pixel in analog by using the signal of the light-shielded pixel P4 in the FBC optical black area 124.

For example, in the signal processing device 11, a reference black level Vfbc is set in advance as a target value of the black level for the signal of the light-shielded pixel P4 in the FBC optical black area 124. The signal processing device 11 obtains a clamp parameter CP for specifying an analog gain of the pixel signal, such that the black level of the signal of the light-shielded pixel P4 becomes the reference black level Vfbc, and supplies the clamp parameter CP to the reference-voltage generation unit 20 of the imaging sensor 10. In response thereto, the reference-voltage generation unit 20 of the imaging sensor 10 determines a slope to be used when generating a reference voltage (slope voltage) Vref, according to the clamp parameter CP, generates the reference voltage (slope voltage) Vref with the determined slope, and supplies the reference voltage (slope voltage) Vref to the ADC circuit 17. The ADC circuit 17 then performs an AD conversion by using the slope voltage supplied from the reference-voltage generation unit 20. At this time, a pixel count value generated by the ADC circuit 17 becomes a value corresponding to a level at which the level of the pixel signal is clamped to the reference black level Vfbc. The signal processing device 11 receives the clamped pixel signal (pixel count value), obtains the clamp parameter CP again such that the black level of the pixel signal reaches the reference black level Vfbc, and supplies the clamp parameter CP to the reference-voltage generation unit 20 of the imaging sensor 10. In this manner, the signal processing device 11 performs a feedback clamp process of obtaining the clamp parameter CP so that the black level of the pixel signal converges to the reference black level Vfbc by executing feedback control.

This feedback clamp process clamps the pixel signal by adjusting the analog gain of the pixel signal; however, a relationship between the analog gain and the clamp parameter may vary due to an environment temperature. Therefore, it may be difficult to accurately adjust the black level of the pixel signal to the reference black level Vfbc, that is, to cause the black level of the pixel signal to fall within a tolerance range with respect to the reference black level Vfbc. For this reason, the signal processing device 11 corrects in digital the black level of the signal of the effective pixel which is adjusted in analog, according to the signal of the light-shielded pixel P1 in the vertical optical black area 121.

Figure 8:
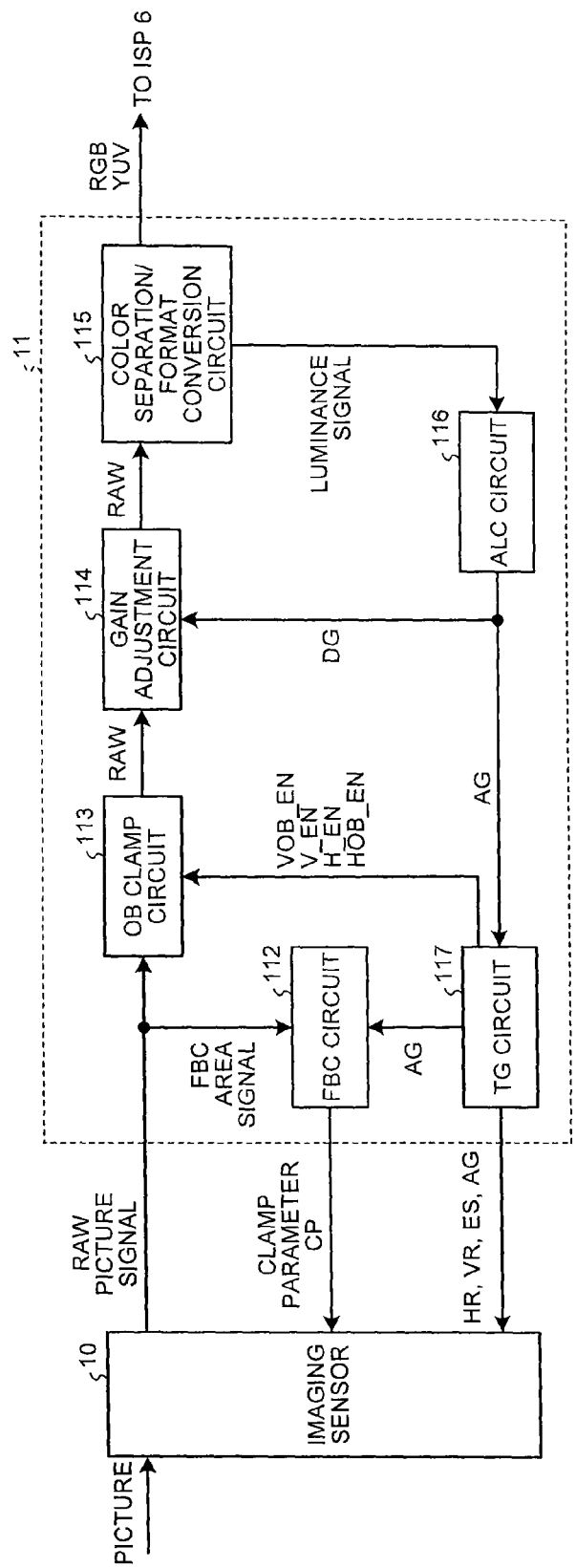
FIG. 8 illustrates a circuit configuration of a signal processing device according to the basic mode.

For example, as shown in FIG. 8, the signal processing device 11 includes a black-level compensation circuit (FBC circuit) 112, an optical black clamp circuit (OB clamp circuit) 113, a gain adjustment circuit 114, a color separation/format conversion circuit 115, an exposing-amount adjustment circuit (ALC circuit) 116, and a timing generator circuit (TG circuit) 117. FIG. 8 is a block diagram illustrating a configuration of the signal processing device 11. The signal processing device 11 generates picture data (for example, a YUV-system video signal) from a picture imaged by the imaging sensor 10. In the signal processing device 11, the process of correcting the black level in digital is performed by the OB clamp circuit 113.

The FBC (FeedBack Clamp) circuit 112 performs the feedback clamp process. For example, the FBC circuit 112 calculates an average value of the pixel signal in the FBC optical black area 124 read from the imaging sensor 10, for example, in units of row. When there is a difference between the calculated average value and the reference black level Vfbc set in advance, the FBC circuit 112 performs an adjustment of the clamp parameter CP such that the average value of the pixel signal in the FBC optical black area 124 is brought closer to the reference black level Vfbc. The FBC circuit 112 feeds back the adjusted clamp parameter CP to the imaging sensor 10. The imaging sensor 10 outputs a signal obtained by adjusting the pixel signal read from a row next to the FBC optical black area 124 by using the fed back clamp parameter CP to the FBC circuit 112. This process is repeated, for example, for each row. That is, the FBC circuit 112 adjusts the black level of the signal of the effective pixel in analog by using the signal of the light-shielded pixel P4 in the FBC optical black area 124.

The OB clamp circuit 113 corrects the signal of the effective pixel, which is adjusted in analog by the FBC circuit 112, in digital. Specifically, the OB clamp circuit 113 determines the reference black level by using the signal of the light-shielded pixel P1 in the vertical optical black area (VOB area) 121 at a frame head of the picture signal (an upper portion in the effective pixel area 123 shown in FIG. 7). The OB clamp circuit 113 corrects the black level of the signal of the effective pixel P3 using the determined reference black level. For example, the OB clamp circuit 113 determines an average value of the signal of the light-shielded pixel P1 in the vertical optical black area 121 as the reference black signal, and adds a correction amount to the signal of the effective pixel P3 such that the black level of the signal of the effective pixel P3 is brought closer to the reference black level. When the black level of the signal of the effective pixel P3 is deviated to a level higher than the reference black level, the correction amount has a negative value to cancel out the deviation. When the black level of the signal of the effective pixel P3 is deviated to a side of a level lower than the reference black level, the correction amount has a positive value to cancel out the deviation. In this manner, the OB clamp circuit 113 performs correction of the black level of the signal of the effective pixel P3. Details of the OB clamp circuit 113 are described later.

The gain adjustment circuit 114 receives a picture signal (RAW) from the OB clamp circuit 113. The picture signal (RAW) includes signals of a plurality of effective pixels (effective picture signals), on each of which the correction of the black level has been performed. The gain adjustment circuit 114 performs an adjustment of white balance or digital gain of the received picture signal. For example, the gain adjustment circuit 114 performs a level adjustment by multiplying the effective picture signal by a parameter (a digital gain signal DG). The parameter (the digital gain signal DG) for the adjustment may be a command set valve, or alternatively, a coefficient calculated by the ALC circuit 116.

The color separation/format conversion circuit 115 receives the picture signal (RAW) on which a gain adjustment has been performed from the gain adjustment circuit 114. For example, the picture signal (RAW) includes information of a color according to a Bayer arrangement, corresponding to each of the signals of the plurality of effective pixels. In response thereto, the color separation/format conversion circuit 115 performs a color separation of the picture signal, and converts the picture signal into an RGB signal or a YUV signal. Furthermore, when performing the color separation, the color separation/format conversion circuit 115 extracts a luminance signal from the picture signal. The color separation/format conversion circuit 115 outputs the RGB signal or the YUV signal to the ISP 6 as picture data, and at the same time, supplies the luminance signal to the ALC circuit 116.

The ALC (Auto Luminance Control) circuit 116 receives the luminance signal from the color separation/format conversion circuit 115. The ALC circuit 116 generates control signals AG and DG for controlling a luminance adjustment of a screen according to the luminance signal. For example, the ALC circuit 116 determines brightness of the screen from an integration value of a 1-V period (a period during which the pixel array 12 is scanned once in a vertical direction) of the luminance signal extracted in the color separation, and automatically adjusts coefficients of the digital gain and analog gain. The ALC circuit 116 generates an analog gain signal AG and a digital gain signal DG according to the adjustment result of the luminance signal. The ALC circuit 116 supplies the digital gain signal DG to the gain adjustment circuit 114 and supplies the analog gain signal AG to the TG circuit 117.

The TG (Timing Generator) circuit 117 controls an operation timing of the imaging sensor 10. For example, the TG circuit 117 generates a pulse for controlling a change timing of signals such as an electronic shutter timing signal ES, a vertical read-out timing signal VR, a horizontal read-out timing signal HR, and the like, and outputs the pulse to the timing control unit 15 of the imaging sensor 10. The electronic shutter timing signal ES is a signal for defining a shutter speed of an electronic shutter. The vertical read-out timing signal VR is a signal for controlling a read-out timing of a pixel signal in a vertical direction (V direction) of the pixel array 12. The horizontal read-out timing signal HR is a signal for controlling a horizontal transfer timing of the pixel signal in a horizontal direction (H direction) of the pixel array 12. Furthermore, the TG circuit 117 receives the analog gain signal AG from the ALC circuit 116, and transfers the analog gain signal AG to the FBC circuit 112 and the timing control unit 15 of the imaging sensor 10.

The TG circuit 117 further generates a VOB enable signal VOB_EN, a V enable signal V_EN, an HOB enable signal HOB_EN, and an H enable signal H_EN, and supplies the generated signals to the OB clamp circuit 113.

Figure 9:
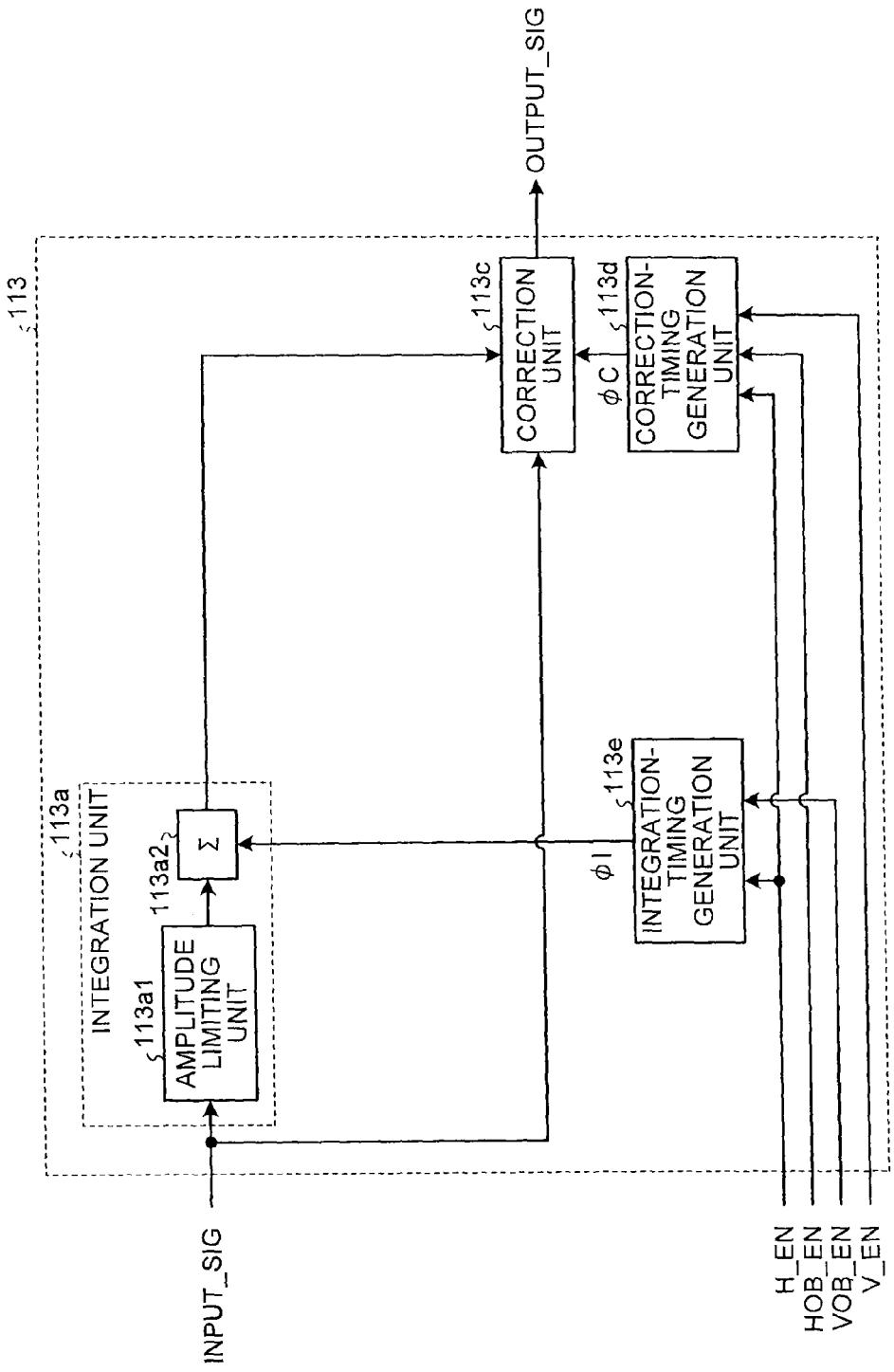
FIG. 9 illustrates a configuration of an OB clamp circuit according to the basic mode.

Next, the OB clamp circuit 113 is described below with reference to FIGS. 9 to 11. FIG. 9 illustrates a configuration of the OB clamp circuit 113. Each of FIGS. 10 and 11 illustrates an operation of the OB clamp circuit 113.

The OB clamp circuit 113 includes an integration-timing generation unit 113e, a correction-timing generation unit 113d, an integration unit 113a, and a correction unit 113c.

The integration-timing generation unit 113e receives the VOB enable signal VOB_EN and the H enable signal H_EN from the TG circuit 117 (see FIG. 8). The integration-timing generation unit 113e generates an integration timing signal φI according to the VOB enable signal VOB_EN and the H enable signal H_EN.

As shown in FIG. 10A, the VOB enable signal VOB_EN is a signal for defining a period for selecting the FBC optical black area (FBC area) 124 and the vertical optical black area (VOB area) 121. For example, a period during which the VOB enable signal VOB_EN is at an active level is defined as a period for determining the reference black level by using the signal of the light-shielded pixel P1 in the vertical optical black area 121.

As shown in FIG. 10A, the H enable signal H_EN is a signal for defining a period for selecting the vertical optical black area (VOB area) 121 and the effective pixel area 123. For example, a period during which the H enable signal H_EN is at an active level is defined as a period for determining the reference black level by using the signal of the light-shielded pixel P1 in the vertical optical black area 121.

As shown in FIG. 10B, the integration-timing generation unit 113e generates the integration timing signal φI such that the integration timing signal φI is at an active level for a period during which both the VOB enable signal VOB_EN and the H enable signal H_EN are at an active level. The integration-timing generation unit 113e supplies the generated integration timing signal φI to the integration unit 113a.

The correction-timing generation unit 113d receives the HOB enable signal HOB_EN, the V enable signal V_EN, and the H enable signal H_EN from the TG circuit 117 (see FIG. 8). The correction-timing generation unit 113d generates a correction timing signal φC according to the HOB enable signal HOB_EN, the V enable signal V_EN, and the H enable signal H_EN.

As shown in FIG. 10A, the HOB enable signal HOB_EN is a signal for defining a period for selecting the FBC optical black area (FBC area) 124 and the horizontal optical black area (HOB area) 122. For example, a period during which the HOB enable signal HOB_EN is at a non-active level is defined as a period for performing a correction operation of correcting the signal of the effective pixel P3 in the effective pixel area 123.

As shown in FIG. 10A, the V enable signal V-EN is a signal for defining a period for selecting the horizontal optical black area (HOB area) 122 and the effective pixel area 123. For example, a period during which the V enable signal V_EN is at an active level is defined as a period for performing a correction operation for correcting the signal of the effective pixel P3 in the effective pixel area 123.

As shown in FIG. 10A, the H enable signal H_EN is a signal for defining a period for selecting the vertical optical black area (VOB area) 121 and the effective pixel area 123. For example, a period during which the H enable signal H_EN is at an active level is defined as a period for performing a correction operation of correcting the signal of the effective pixel P3 in the effective pixel area 123.

As shown in FIG. 10B, the correction-timing generation unit 113d generates the correction timing signal φC such that the correction timing signal φC is at an active level for a period during which the HOB enable signal HOB_EN is at a non-active level and both the V enable signal V_EN and the H enable signal H_EN are at an active level. The correction-timing generation unit 113d supplies the generated correction timing signal φC to the correction unit 113c.

Signals, which are the signals of the plurality of light-shielded pixels P1 in the vertical optical black area 121 and the black levels of which have been adjusted in analog by the FBC circuit 112, are input to the integration unit 113a shown in FIG. 9. A signal (a noise signal) of a light-shielded pixel that has a defect such as a white defect or a black defect may be included in the signals of the plurality of light-shielded pixels P1. The light-shielded pixel having the white defect outputs a signal having luminance higher than that of a normal light-shielded pixel. The light-shielded pixel that has the black defect outputs a signal having luminance lower than that of a normal light-shielded pixel. That is, the signal of the light-shielded pixel having a defect such as a white defect or a black defect is likely to be a signal having a level considerably deviated from a signal level of a normal light-shielded pixel. Furthermore, a signal of a light-shielded pixel for which the shielding by the shielding film is insufficient may be included in the signals of the plurality of light-shielded pixels P1. A signal (a noise signal) of the light-shielded pixel for which the shielding by a shielding film is insufficient is likely to be a signal having a level considerably deviated from the signal level of a normal light-shielded pixel.

If the signals of the plurality of light-shielded pixels P1 in the vertical optical black area 121 are integrated as these signals are in the integration unit 113a, these signals are integrated while including a considerable amount of noise components, and thus the accuracy of determining the reference black level by using these signals of the light-shielded pixels P1 is likely to be degraded.

Therefore, the integration unit 113a integrates and averages the signals of the plurality of light-shielded pixels P1 in the vertical optical black area 121 in a first integration region IR1 (see FIG. 11). That is, the integration unit 113a limits a level width of the input signals of the plurality of light-shielded pixels P1 to the first integration region IR1, and integrates and averages a plurality of signals of which the level width is limited. The first integration region IR1 has a center level Ref1, an upper limit level Maxi, and a lower limit level Mini determined in advance.

Specifically, the integration unit 113a includes an amplitude limiting unit 113a1 and an integration processing unit 113a2. The amplitude limiting unit 113a1 limits the level width of the signals of the plurality of input light-shielded pixels P1 (INPUT_SIG) to the first integration region IR1. The amplitude limiting unit 113a1 transfers the plurality of signals, of which the level width is limited, to the integration processing unit 113a2.

The center level Ref1, the upper limit level Max1, and the lower limit level Min1 of the first integration region IR1 are experimentally determined in advance and set to the amplitude limiting unit 113a1. A level width from the upper limit level Maxi to the center level Ref1 and a level width from the center level Ref1 to the lower limit level Mini may be equal to each other (see FIG. 11).

Furthermore, a level width ΔLW1 of the first integration region IR1 is experimentally determined in advance and set to the amplitude limiting unit 113a1.

For example, the amplitude limiting unit 113a1 ignores a signal exceeding the upper limit level Maxi of the first integration region IR1 and ignores a signal below the lower limit level Mini of the first integration region IR1 among the signals of the plurality of light-shielded pixels P1. That is, the amplitude limiting unit 113a1 excludes a signal out of the first integration region IR1 among the signals of the plurality of light-shielded pixels P1, and selectively transfers a plurality of signals that falls within the first integration region IR1 to the integration processing unit 113a2.

Alternatively, for example, the amplitude limiting unit 113a1 coordinates a level of a signal exceeding the upper limit level Maxi of the first integration region IR1 to the upper limit level Maxi and coordinates a level of a signal below the lower limit level Mini of the first integration region IR1 to the lower limit level Mini among the signals of the plurality of light-shielded pixels P1. That is, the amplitude limiting unit 113a1 slices a signal out of the first integration region IR1 among the signals of the plurality of light-shielded pixels P1 at the upper limit level Max1 and the lower limit level Mini, and transfers a plurality of signals including the signals sliced at the upper limit level Max1 and the lower limit level Mini to the integration processing unit 113a2.

The integration processing unit 113a2 receives the plurality of signals of which the level width has been limited from the amplitude limiting unit 113a1, and receives the integration timing signal φI from the integration-timing generation unit 113e. The integration processing unit 113a2 integrates and averages the plurality of signals in synchronization with the integration timing signal φI. For example, the integration processing unit 113a2 integrates and averages (for example, adds and averages) the plurality of signals in a period during which the integration timing signal φI shown in FIG. 10B is at an active level (for example, an H level). The integration processing unit 113a2 supplies an integrated and averaged result to the correction unit 113c.

The correction unit 113c receives the integrated and averaged result from the integration processing unit 113a2 in a period for determining the reference black level. The period for determining the reference black level is, for example, a period during which the VOB enable signal VOB_EN shown in FIG. 10B is at an active level (for example, an H level). The correction unit 113c determines the reference black level based on the received integrated and averaged result. For example, the correction unit 113c averages a plurality of integrated and averaged results of a main integration, and determines the result as the reference black level.

The correction unit 113c receives signals, which are signals of the plurality of effective pixels P3 in the effective pixel area 123 and of which the black level has been adjusted in analog by the FBC circuit 112, in a period for correcting the signal of the effective pixel. The period for correcting the signal of the effective pixel is, for example, a period during which the VOB enable signal VOB_EN shown in FIG. 10B is at a non-active level (for example, an L level). The correction unit 113c corrects the signal of the effective pixel using the determined reference black level in the period for determining the reference black level. For example, the correction unit 113c obtains a difference between the black level of the signal of the effective pixel and the reference black level, and adds a correction amount with which the difference is canceled out to the signal of the effective pixel. The correction amount has, for example, an amplitude equal to the obtained difference and an opposite sign. The correction unit 113c outputs a corrected signal (OUTPUT_SIG) of the effective pixel to the ISP 6.

As above, in the OB clamp circuit 113, the center level Ref1 and the level width ΔLW1 of the first integration region IR1 used by the amplitude limiting unit 113a1 are experimentally determined in advance and set to the amplitude limiting unit 113a1 in a fixed manner. In the first integration region IR1, it is assumed that the adjustment of the black level in analog by the FBC circuit 112 is stably performed and a center level of the signal that has been adjusted in analog substantially matches the center level Ref1 of the first integration region IR1.

However, in practice, a relationship between the analog gain and the clamp parameter may vary due to an environment temperature, and thus the center level of the signal that has been adjusted in analog is likely to be deviated from the center level Ref1 of the first integration region IR1. Furthermore, the relationship between the analog gain and the clamp parameter may vary due to temporal degradation of each element (for example, a transistor) that constitutes the signal processing device 11 and the imaging sensor 10, and thus the center level of the signal that has been adjusted in analog is likely to be deviated from the center level Ref1 of the first integration region IR1. For example, when the signal that has been adjusted in analog is deviated from the center level Ref1 of the first integration region IR1, the first integration region IR1 appears as shown in FIGS. 11A and 11B. FIGS. 11A and 11B illustrate the operation of the OB clamp circuit 113. In FIGS. 11A and 11B, signals of a plurality of light-shielded pixels that have been adjusted in analog (a plurality of discrete digital signals) are shown as a continuous signal for convenience of simplifying the drawing.

As shown in FIG. 11A, when a level width ΔLW1-1 of a first integration region IR1-1 is broadly set to cover the most portion of the level width of the signal that has been adjusted in analog, an unnecessary noise level portion NP is included in a processing target of the integration processing unit 113a2. Furthermore, because the center level of the signal that has been adjusted in analog is deviated toward a high amplitude side with respect to the center level Ref1 of the first integration region IR1-1, regardless of the broadly set level width ΔLW1-1, an appropriate reference signal level portion SP1 is excluded from the processing target of the integration processing unit 113a2. This leads to a state where the integration is performed in a state where an appropriate reference signal component is attenuated and a large amount of noise portion is included, and thus the accuracy of determining the reference black level by using the signals of the light-shielded pixels P1 is likely to be degraded.

Meanwhile, as shown in FIG. 11B, when a level width ΔLW1-2 of a first integration region IR1-2 is narrowly set such that the noise level portion NP is not included, an appropriate reference signal level portion SP2 is excluded from the processing target of the integration processing unit 113a2. The appropriate reference signal level portion SP2 has a larger signal amount than the appropriate reference signal level portion SP1 shown in FIG. 11A. This leads to a state where the integration is performed in a state where an appropriate reference signal component is attenuated and a large amount of noise portion is included, and thus the accuracy of determining the reference black level by using the signals of the plurality of light-shielded pixels P1 is likely to be degraded. Besides, the appropriate reference signal level portion SP2 includes a component close to its intended average value compared to the appropriate reference signal level portion SP1. This leads to a state where the integration is performed in a state where the component close to the intended average value is dropped out, and thus the integrated and averaged result may not be available.

In this manner, when the reference black level is determined by using the first integration region IR1 that is set in a fixed manner, if the center level of the signal of the light-shielded pixel that has been adjusted in analog varies, the accuracy of determining the reference black level is likely to be degraded.

Figure 1:
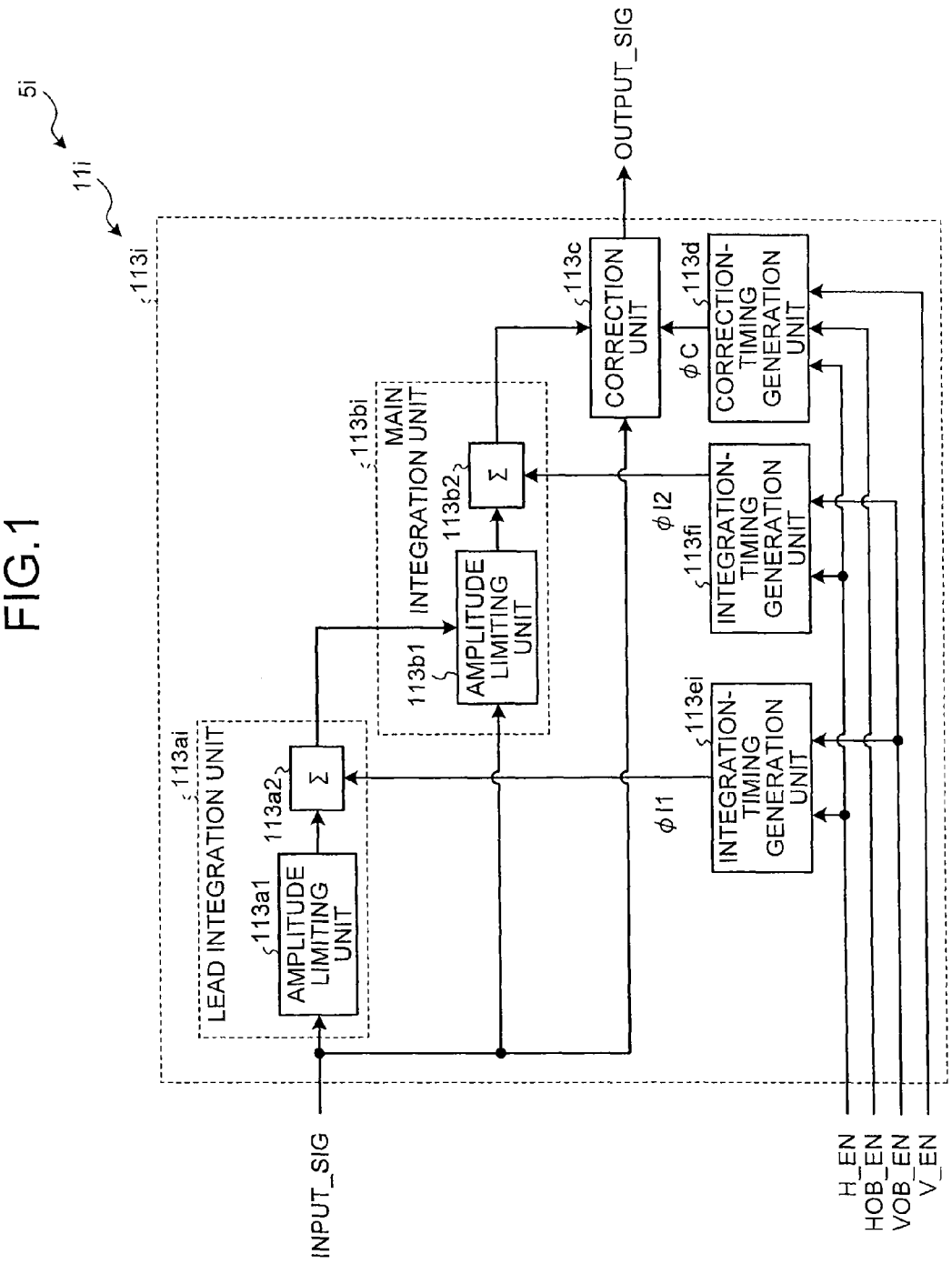
FIG. 1 illustrates a configuration of an OB clamp circuit according to an embodiment.

Therefore, in the present embodiment, as shown in FIG. 1, the integrating and averaging is performed in two stages, where the center level of the signal of the light-shielded pixel is determined in a first-stage integrating and averaging (a lead integration) and a second-stage integrating and averaging (a main integration) is performed in an integration region while considering the determined center level. FIG. 1 illustrates a configuration of an OB clamp circuit 113i according to the present embodiment. Parts different from those of the basic mode are mainly explained below.

Specifically, a signal processing device 11*i* of the solid imaging device 5*i* includes the OB clamp circuit 113*i* in place of the OB clamp circuit 113 (see FIGS. 8 and 9). The OB clamp circuit 113*i* performs a lead integration and a main integration as the two-stage integrating and averaging. In the lead integration, the integrating and averaging is performed in the first integration region IR1 that is determined in advance (see FIG. 4A), to obtain a rough average value of the signal of the light-shielded pixel. In the main integration, a second integration region IR2 is determined by using the rough average value as a center level, and the signal of the light-shielded pixel is integrated and averaged in the determined second integration region IR2 (see FIG. 4B). At this time, a level width ΔLW2 of the second integration region IR2 may be narrower than the level width ΔLW1 of the first integration region IR1.

Figure 2:
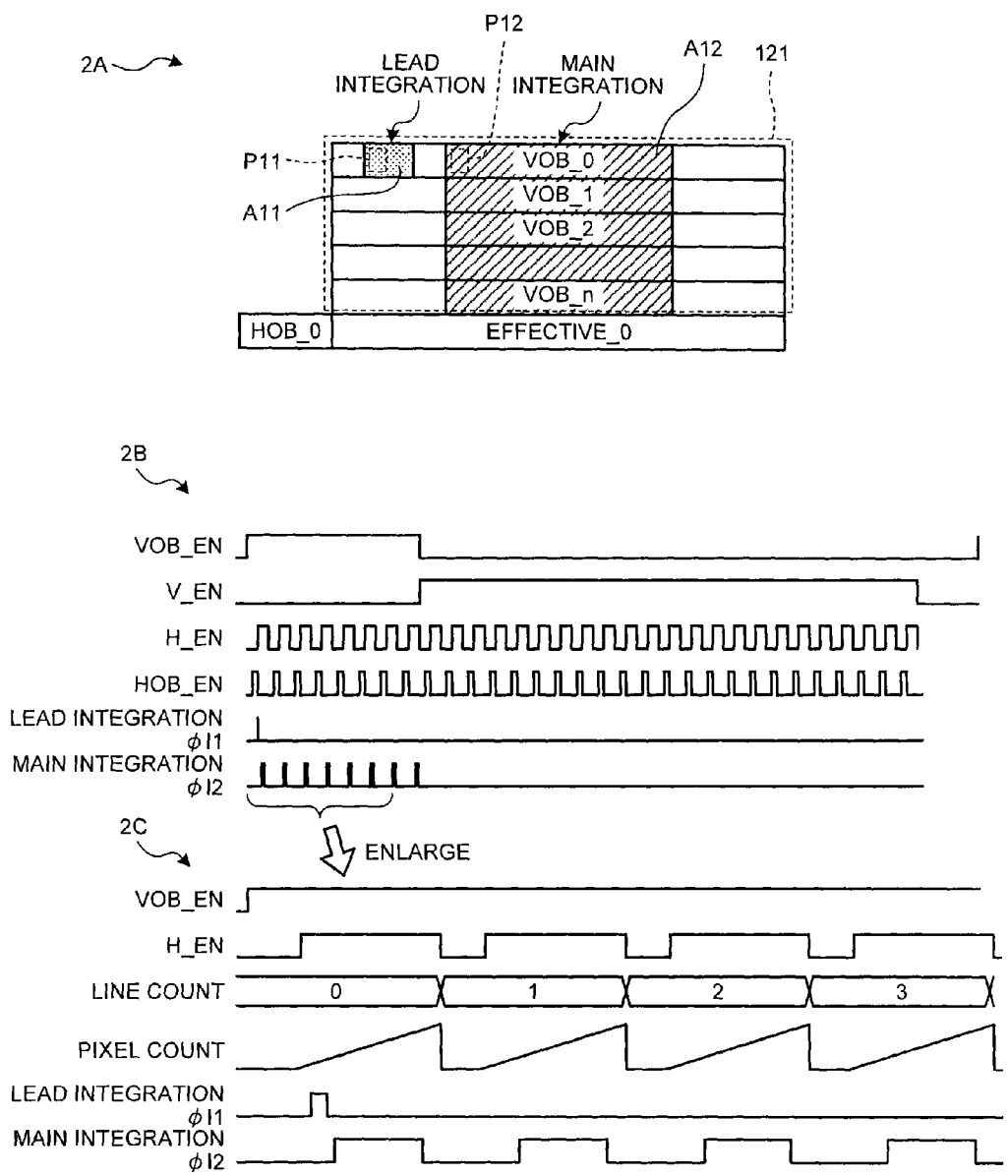
FIGS. 2A to 2C illustrate an operation of the OB clamp circuit according to the embodiment.
Figure 3:
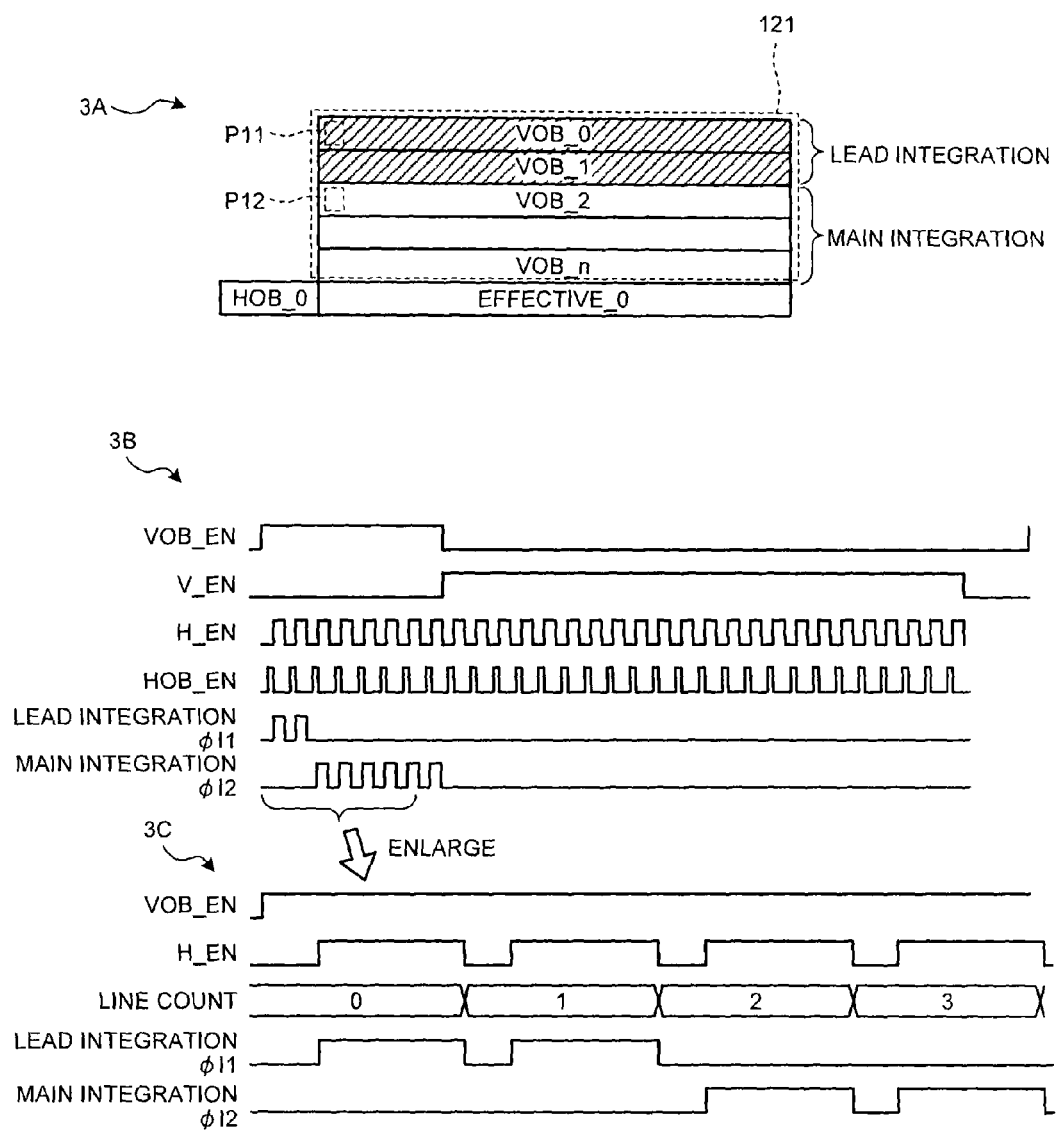
FIGS. 3A to 3C illustrate the operation of the OB clamp circuit according to the embodiment.

Furthermore, the OB clamp circuit 113*i* may switch the lead integration and the main integration in the same row of the vertical optical black area 121 (see FIG. 2) or may switch the lead integration and the main integration in units of row in the vertical optical black area 121 (see FIGS. 3).

More specifically, the OB clamp circuit 113*i* includes an integration-timing generation unit 113*ei* and a lead integration unit 113*ai* in place of the integration-timing generation unit 113*e* and the integration unit 113*a* (see FIG. 9), and further includes an integration-timing generation unit 113*fi* and a main integration unit 113*bi*.

The integration-timing generation unit 113*ei* receives the VOB enable signal VOB_EN and the H enable signal H_EN from the TG circuit 117 (see FIG. 8). The integration-timing generation unit 113*ei* generates a lead integration timing signal φI1 according to the VOB enable signal VOB_EN and the H enable signal H_EN.

For example, when switching the lead integration and the main integration in the same row of the vertical optical black area 121, the integration-timing generation unit 113*ei* generates the lead integration timing signal φI1 to correspond to a light-shielded pixel P11 shown in FIG. 2A. That is, the integration-timing generation unit 113*ei* generates the lead integration timing signal φI1 such that the lead integration timing signal φI1 is at an active level at a timing at which a plurality of light-shielded pixels P11 included in an area A11 on a head side in a row VOB_0 is read out. For example, as shown in FIGS. 2B and 2C, the integration-timing generation unit 113*ei* generates the lead integration timing signal φI1 such that the lead integration timing signal φI1 is at an active level for a period that is a period on a head side in a period during which both the VOB enable signal VOB_EN and the H enable signal H_EN are at an active level and having a length corresponding to the number of the light-shielded pixels P11 in the area A11.

FIGS. 2A to 2C illustrate an operation of the OB clamp circuit 113*i* in a case where the lead integration and the main integration are switched in the same row of the vertical optical black area 121. In FIGS. 2A to 2C, a case where the lead integration is performed for the area A11 on the head side in the head row VOB_0 of the vertical optical black area 121 and the lead integration is not performed for the subsequent rows VOB_1 to VOB_n is instantiated; however, the lead integration may be performed for at least a portion of the rows VOB_1 to VOB_n.

Alternatively, for example, when the lead integration and the main integration are switched in units of row in the vertical optical black area 121, the integration-timing generation unit 113*ei* generates the lead integration timing signal φI1 to correspond to the light-shielded pixel P11 shown in FIG. 3A. That is, the integration-timing generation unit 113*ei* generates the lead integration timing signal φI1 such that the lead integration timing signal φI1 is at an active level at a timing at which a plurality of light-shielded pixels P11 included in the rows VOB_0 and VOB_1 on the head side of the vertical optical black area 121 is read out. For example, as shown in FIGS. 3B and 3C, the integration-timing generation unit 113*ei* generates the lead integration timing signal φI1 such that the lead integration timing signal φI1 is at an active level for a period that is a period during which both the VOB enable signal VOB_EN and the H enable signal H_EN are at an active level and corresponding to the rows VOB_0 and VOB_1 on the head side.

FIGS. 3A to 3C illustrate an operation of the OB clamp circuit 113*i* in a case where the lead integration and the main integration are switched in units of row in the vertical optical black area 121. In FIGS. 3A to 3C, a case where the lead integration is performed for the rows VOB_0 and VOB_1 on the head side of the vertical optical black area 121 and the lead integration is not performed for the subsequent rows VOB_2 to VOB_n; however, a process may be performed such that the lead integration is performed for one row VOB_0 and the lead integration is not performed for the subsequent rows VOB_1 to VOB_n. Alternatively, a process may be performed such that the lead integration is performed for the rows VOB_0 and VOB_1, and the lead integration is further performed for a portion of the subsequent rows VOB_2 to VOB_n (for example, VOB_n/2 and VOB_n/2+1).

The integration-timing generation unit 113*fi* receives the VOB enable signal VOB_EN and the H enable signal H_EN from the TG circuit 117 (see FIG. 8). The integration-timing generation unit 113*fi* generates a main integration timing signal φI2 according to the VOB enable signal VOB_EN and the H enable signal H_EN.

For example, when switching the lead integration and the main integration in the same row of the vertical optical black area 121, the integration-timing generation unit 113*fi* generates the main integration timing signal φI2 to correspond to a light-shielded pixel P12 shown in FIG. 2A. That is, the integration-timing generation unit 113*fi* generates the main integration timing signal φI2 such that the main integration timing signal φI2 is at an active level at a timing at which a plurality of light-shielded pixels P12 included in an area A12 after the area A11 in the row VOB_0 is read out. For example, as shown in FIGS. 2B and 2C, the integration-timing generation unit 113*fi* generates the main integration timing signal φI2 such that the main integration timing signal φI2 is at an active level for a period that is a period on a center side in a period during which both the VOB enable signal VOB_EN and the H enable signal H_EN are at an active level and having a length corresponding to the number of the light-shielded pixels P12 in the area A12.

As shown in FIGS. 2A to 2C, the main integration is performed for the area A12 in the head row VOB_0 of the vertical optical black area 121, and then the main integration may also be performed for areas corresponding to the area A12 in the subsequent rows VOB_1 to VOB_n.

Alternatively, for example, when the lead integration and the main integration are switched in units of row in the vertical optical black area 121, the integration-timing generation unit 113*fi* generates the main integration timing signal φI2 to correspond to the light-shielded pixel P12 shown in FIG. 3A. That is, the integration-timing generation unit 113*fi* generates the main integration timing signal φI2 such that the main integration timing signal φI2 is at an active level at a timing at which a plurality of light-shielded pixels P12 included in the rows VOB_2 and VOB_n after the integration rows VOB_0 and VOB_1 of the vertical optical black area 121 is read out.

For example, as shown in FIGS. 3B and 3C, the integration-timing generation unit 113*fi* generates the main integration timing signal φI2 such that the main integration timing signal φI2 is at an active level for a period that is a period during which both the VOB enable signal VOB_EN and the H enable signal H_EN are at an active level and corresponding to the rows VOB_2 to VOB_n on a tail side described above.

In FIGS. 3A to 3C, a case where the main integration is performed for the subsequent rows VOB_2 to VOB_n next to the rows VOB_0 and VOB_1 on the head side of the vertical optical black area 121 is instantiated; however, the main integration may be performed for one of the subsequent rows VOB_2 to VOB_n. Alternatively, the lead integration and the main integration may be performed in an alternate manner. For example, the lead integration is performed for the rows VOB_0 and VOB_1 on the head side, the main integration is performed for next rows VOB_2 to VOB_n/2−1, the lead integration is performed for the next rows VOB_n/2, VOB_n/2+1), and then the main integration is performed for the rest of rows VOB_n/2+2 to VOB_n.

Signals, which are signals of the plurality of light-shielded pixels P11 in the vertical optical black area 121 and the black levels of which have been adjusted in analog by the FBC circuit 112, are input to the lead integration unit 113*ai*. The lead integration unit 113*ai* integrates and averages the signals of the plurality of light-shielded pixels P11 in the vertical optical black area 121 in the first integration region IR1 (see FIG. 4). That is, the lead integration unit 113*ai* limits a level width of the input signals of the plurality of light-shielded pixels P11 to the first integration region IR1, and integrates and averages a plurality of signals of which the level width is limited. The first integration region IR1 may have a center level Ref1, an upper limit level Max1, and a lower limit level Min1 determined in advance. The lead integration unit 113*ai* may perform the lead operation for plural times.

Specifically, the lead integration unit 113*ai* includes an amplitude limiting unit 113*a*1 and an integration processing unit 113*a*2. The amplitude limiting unit 113*a*1 limits the level width of the signals of the plurality of input light-shielded pixels P11 (INPUT_SIG) to the first integration region IR1. The amplitude limiting unit 113*a*1 transfers the plurality of signals, of which the level width is limited, to the integration processing unit 113*a*2.

For example, the amplitude limiting unit 113*a*1 ignores a signal exceeding the upper limit level Max1 of the first integration region IR1 and ignores a signal below the lower limit level Min1 of the first integration region IR1 among the signals of the plurality of light-shielded pixels P11. That is, the amplitude limiting unit 113*a*1 excludes a signal out of the first integration region IR1 among the signals of the plurality of light-shielded pixels P11, and selectively transfers a plurality of signals that falls within the first integration region IR1 to the integration processing unit 113*a*2.

Alternatively, for example, the amplitude limiting unit 113*a*1 coordinates a level of a signal exceeding the upper limit level Maxi of the first integration region IR1 to the upper limit level Maxi and coordinates a level of a signal below the lower limit level Min1 of the first integration region IR1 to the lower limit level Mini among the signals of the plurality of light-shielded pixels P11. That is, the amplitude limiting unit 113*a*1 slices a signal out of the first integration region IR1 among the signals of the plurality of light-shielded pixels P11 at the upper limit level Maxi and the lower limit level Min1, and transfers a plurality of signals including the signals sliced at the upper limit level Maxi and the lower limit level Mini to the integration processing unit 113*a*2.

The integration processing unit 113*a*2 receives the plurality of signals of which the level width has been limited from the amplitude limiting unit 113*a*1, and receives a lead integration timing signal φI1 from the integration-timing generation unit 113*ei*. The integration processing unit 113*a*2 integrates and averages the plurality of signals in synchronization with the lead integration timing signal φI1.

For example, when switching the lead integration and the main integration in the same row of the vertical optical black area 121, the integration processing unit 113*a*2 integrates and averages (for example, adds and averages) the plurality of signals during a period during which the lead integration timing signal φI1 shown in FIGS. 2B and 2C is at an active level (for example, an H level).

Alternatively, for example, when switching the lead integration and the main integration in units of row in the vertical optical black area 121, the integration processing unit 113*a*2 integrates and averages (for example, adds and averages) the plurality of signals during a period during which the lead integration timing signal φI1 shown in FIGS. 3B and 3C is at an active level (for example, an H level). For example, in the case shown in FIGS. 3B and 3C, the integration processing unit 113*a*2 performs the lead integration for plural times.

The integration processing unit 113*a*2 supplies an integrated and averaged result of the lead integration to the main integration unit 113*bi*. When the lead integration is performed for plural times, the integration processing unit 113*a*2 may supply the integrated and averaged result of the lead integration to the main integration unit 113*bi* every time the lead integration is performed.

The main integration unit 113*bi* receives the integrated and averaged result of the lead integration from the integration processing unit 113*a*2 of the lead integration unit 113*ai*. The main integration unit 113*bi* determines the second integration region IR2 (see FIG. 4) based on the integrated and averaged result of the lead integration.

For example, the main integration unit 113*bi* determines a center level of the second integration region IR2 based on the integrated and averaged result of the lead integration. The main integration unit 113*bi* may determine an average value Ref2' obtained from the lead integration as a center level Ref2 of the second integration region IR2 (see FIG. 4). Furthermore, upon reception of a plurality of integrated and averaged results of the lead integration, the main integration unit 113*bi* may determine a value obtained by averaging the plurality of integrated and averaged results of the lead integration, as the center level Ref2 of the second integration region IR2 (see FIG. 4).

Figure 4:
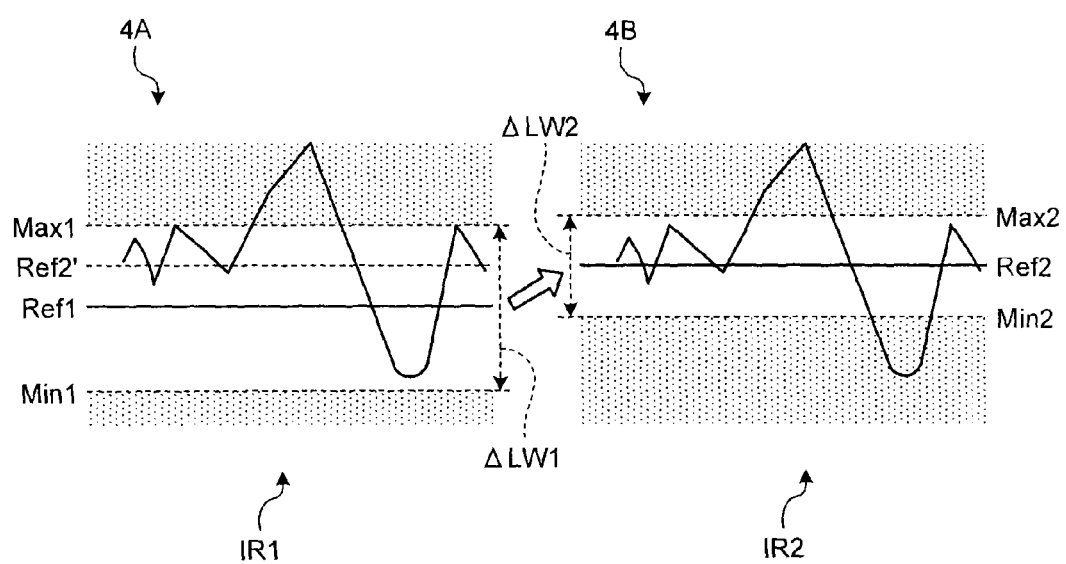
FIGS. 4A and 4B illustrate the operation of the OB clamp circuit according to the embodiment.

Further, the main integration unit 113*bi* may determine the second integration region IR2 such that the level width ΔLW2 of the second integration region IR2 is narrower than the level width ΔLW1 of the first integration region IR1 (see FIG. 4). In response thereto, the main integration unit 113*bi* may determine an upper limit level Max2 and a lower limit level Min2 of the second integration region IR2.

The main integration unit 113*bi* integrates and averages signals of a plurality of light-shielded pixels in the vertical optical black area 121 in the second integration region IR2. That is, the main integration unit 113*bi* limits the level width of the input signals of the plurality of light-shielded pixels P12 to the second integration region IR2, and integrates and averages the plurality of signals of which the level width is limited. The main integration unit 113*bi* may perform the main integration for plural times.

Specifically, the main integration unit 113*bi* includes an amplitude limiting unit 113*b*1 and an integration processing unit 113*b*2. The amplitude limiting unit 113*b*1 limits the level width of the input signals of the plurality of light-shielded pixels P12 to the second integration region IR2. The main integration unit 113*bi* transfers the plurality of signals of which the level width is limited, to the integration processing unit 113*b*2.

For example, the amplitude limiting unit 113*b*1 ignores a signal exceeding the upper limit level Max2 of the second integration region IR2 and ignores a signal below the lower limit level Min2 of the second integration region IR2 among the signals of the plurality of light-shielded pixels P12. That is, the amplitude limiting unit 113*b*1 excludes a signal out of the second integration region IR2 among the signals of the plurality of light-shielded pixels P12, and selectively transfers a plurality of signals that falls within the second integration region IR2 to the integration processing unit 113*b*2.

Alternatively, for example, the amplitude limiting unit 113*bl* coordinates a level of a signal exceeding the upper limit level Max2 of the second integration region IR2 to the upper limit level Max2 and coordinates a level of a signal below the lower limit level Min2 of the second integration region IR2 to the lower limit level Min2 among the signals of the plurality of light-shielded pixels P12. That is, the amplitude limiting unit 113*b*1 slices a signal out of the second integration region IR2 among the signals of the plurality of light-shielded pixels P12 at the upper limit level Max2 and the lower limit level Min2, and transfers a plurality of signals including the signals sliced at the upper limit level Max2 and the lower limit level Min2 to the integration processing unit 113*b*2.

The integration processing unit 113*b*2 receives the plurality of signals of which the level width has been limited from the amplitude limiting unit 113*b*1, and receives the main integration timing signal φI2 from the integration-timing generation unit 113*fi*. The integration processing unit 113*b*2 integrates and averages the plurality of signals in synchronization with the main integration timing signal φI2.

For example, when switching the lead integration and the main integration in the same row of the vertical optical black area 121, the integration processing unit 113*b*2 integrates and averages (for example, adds and averages) the plurality of signals during a period during which the main integration timing signal φI2 shown in FIGS. 2B and 2C is at an active level (for example, an H level).

Alternatively, for example, when switching the lead integration and the main integration in units of row in the vertical optical black area 121, the integration processing unit 113*b*2 integrates and averages (for example, adds and averages) the plurality of signals during a period during which the main integration timing signal φI2 shown in FIGS. 3B and 3C is at an active level (for example, an H level).

The integration processing unit 113*b*2 supplies an integrated and averaged result of the main integration to the correction unit 113*c*. The correction unit 113*c* determines the reference black level based on the received integrated and averaged result of the main integration. Thereafter, the correction unit 113*c* corrects the signal of the effective pixel using the determined reference black level in the period for determining the reference black level. The correction unit 113*c* then outputs a corrected signal (OUTPUT_SIG) of the effective pixel to the ISP 6.

In the OB clamp circuit 113*i*, for example, the center level Ref1 and the level width ΔLW1 of the first integration region IR1 used by the amplitude limiting unit 113*a*1 are experimentally determined in advance and set to the amplitude limiting unit 113*a*1 in a fixed manner. At this time, for example, when the center level of the signal of the light-shielded pixel, which has been adjusted in analog, is deviated toward the high amplitude side with respect to the center level Ref1 of the first integration region IR1, the first integration region IR1 appears as shown in FIG. 4A. FIGS. 4A and 4B illustrate an operation of the OB clamp circuit 113*i*. In FIGS. 4A and 4B, signals of a plurality of light-shielded pixels that have been adjusted in analog (a plurality of discrete digital signals) are shown as a substantially continuous signal for simplifying the drawing.

In the lead integration, as shown in FIG. 4A, the level width ΔLW1 of the first integration region IR1 is broadly set to cover, for example, the most portion of the level width of the signal that has been adjusted in analog. In this lead integration, when the signal of the light-shielded pixel is integrated and averaged in the first integration region IR1, a rough average value Ref2' can be obtained with respect to the signal of the light-shielded pixel. Although the average value Ref2' is a value obtained by an integration in a state where noise component is included to some extent, it can be used as a value indicating the rough average value.

In the main integration, as shown in FIG. 4B, the second integration region IR2 having the center level Ref2 corresponding to the average value Ref2' obtained in the lead integration is determined. At this time, if the level width ΔLW12 of the second integration region IR2 is set to a value narrower than the level width ΔLW1 of the first integration region IR1, the noise component on the high amplitude side and the noise component on the low amplitude side can be efficiently excluded. That is, the integration can be performed in a state where the noise components are reduced, and thus the accuracy of determining the reference black level by using the signal of the light-shielded pixel can be easily improved.

Furthermore, as shown in FIG. 4B, the center level Ref2 corresponds to the average value Ref2' obtained in the lead integration. Therefore, the deviation of the center level of the signal of the light-shielded pixel that has been adjusted in analog from the center level Ref2 of the second integration region IR2 can become smaller than the deviation of the center level of the signal of the light-shielded pixel that has been adjusted in analog from the center level Ref1 of the first integration region IR1. That is, it can be suppressed to perform an integration in a state where the component close to the intended average value is dropped out, and thus the accuracy of determining the reference black level by using the signal of the light-shielded pixel can be easily improved also from this aspect.

As described above, in the present embodiment, in the OB clamp circuit 113*i* of the signal processing device 11*i*, the lead integration unit 113*ai* integrates and averages the signals of the plurality of light-shielded pixels P11 in the vertical optical black area 121 in the first integration region IR1. The main integration unit 113*bi* integrates and averages the signals of the plurality of light-shielded pixels P12 in the vertical optical black area 121 in the second integration region IR2 that is determined based on the integrated and averaged result of the lead integration unit 113*ai*. The correction unit 113*c* determines the reference black level based on the integrated and averaged result of the main integration unit 113*bi*, and corrects the black level of the effective pixel P3 using the determined reference black level. With this operation, when the center level of the signal of the light-shielded pixel after being adjusted in analog varies, the center level of the second integration region IR2 can be brought closer to the center level after the change. This can improve the accuracy of the integrating and averaging of the main integration unit 113*bi*, and thus the accuracy of determining the reference black level based on the integrated and averaged result of the main integration unit 113*bi* can also be improved. That is, when the center level of the signal of the light-shielded pixel after being adjusted in analog varies, the accuracy of determining the reference black level by using the signal of the light-shielded pixel can be easily improved. Accordingly, the black level of the effective pixel can be corrected with high accuracy.

In the present embodiment, in the OB clamp circuit 113$i$ of the signal processing device 11$i$, the main integration unit 113$bi$ determines the center level Ref2 of the second integration region IR2 based on the integrated and averaged result of the lead integration unit 113$ai$. With this operation, when the center level of the signal of the light-shielded pixel after being adjusted in analog varies, the center level of the second integration region IR2 can be brought closer to the center level after the change.

In the present embodiment, in the OB clamp circuit 113$i$ of the signal processing device 11$i$, the main integration unit 113$bi$ determines the second integration region IR2 such that the level width ΔLW2 of the second integration region IR2 becomes narrower than the level width ΔLW1 of the first integration region IR1. With this operation, the level width ΔLW2 of the second integration region IR2 can be set narrower than the level width ΔLW1 of the first integration region IR1 while bringing the center level of the second integration region IR2 close to the center level after the change. Therefore, the noise component on the high amplitude side and the noise component on the low amplitude side can be efficiently excluded, and the integration can be performed in a state where the noise components are reduced, and thus the accuracy of determining the reference black level by using the signal of the light-shielded pixel can be easily improved.

In the present embodiment, in the OB clamp circuit 113$i$ of the signal processing device 11$i$, the lead integration unit 113$ai$ performs, for example, the integrating and averaging for plural times on the signals of the plurality of light-shielded pixels P11. At this time, the main integration unit 113$bi$ averages a plurality of integrated and averaged results from the lead integration unit 113$ai$, and determines the center level of the second integration region IR2 based on the averaged integrated and averaged result. With this operation, the accuracy of determining the center level of the second integration region IR2 can be easily improved.

It should be noted that the main integration unit 113$bi$ may determine the level width of the second integration region IR2 based on the integrated and averaged result of the lead integration unit 113$ai$. For example, when the number of times where the signal of the light-shielded pixel exceeding the upper limit level Max1 or below the minimum level Min1 is equal to or larger than a threshold value, the main integration unit 113$bi$ obtains the level width of the second integration region IR2 by subtracting a first width from the level width of the first integration region IR1. When the number of times where the signal of the light-shielded pixel exceeding the upper limit level Max$i$ or below the minimum level Min1 is smaller than the threshold value, the main integration unit 113$bi$ obtains the level width of the second integration region IR2 by subtracting a second width from the level width of the first integration region IR1. The second width is larger than the first width. With this operation, the level width of the second integration region IR2 can be determined while considering the degree of the noise component being out of the first integration region IR1.

Alternatively, when performing the lead integration for plural rounds, the lead integration unit 113$ai$ may adjust the first integration region from the first integration region with parameters experimentally determined in advance. For example, the lead integration unit 113$ai$ integrates and averages the signal of the light-shielded pixel P11 in the first integration region IR1 with the center level Ref1, the upper limit level Max$i$, and the lower limit level Min1 experimentally determined in advance in the first round of lead integration. The lead integration unit 113$ai$ then determines a first integration region IR1' based on the integrated and averaged result of the first round of lead integration in a period from an end of the first round of lead integration to a start of the second round of lead integration. That is, the lead integration unit 113$ai$ determines the average value obtained in the first round of lead integration as the center level Ref1 of the first integration region IR1', and determines the first integration region IR1' such that the level width of the first integration region IR1' becomes equal to the level width of the first integration region IR1. The lead integration unit 113$ai$ then may integrate and average the signal of the light-shielded pixel P11 in the determined first integration region IR1' in the second and subsequent rounds of lead integrations. With this operation, when the center level of the signal of the light-shielded pixel after being adjusted in analog varies, the center level of the first integration region IR1' can be brought closer to the center level after the change. Accordingly, when the center level of the signal of the light-shielded pixel after being adjusted in analog varies, the center level of the second integration region IR2 can be more easily brought closer to the center level after the change.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A signal processing device that processes a signal output from an imaging sensor that includes a light receiving area in which a plurality of light receiving pixels is arranged and a light-shielded area in which a plurality of light-shielded pixels is arranged, the device comprising:

a lead integration unit that integrates and averages, in a first integration region, signals of a plurality of first light-shielded pixels in the light-shielded area;

a main integration unit that integrates and averages, in a second integration region that is determined based on a result integrated and averaged by the lead integration unit, signals of a plurality of second light-shielded pixels in the light-shielded area; and a correction unit that determines a reference black level based on a result integrated and averaged by the main integration unit and corrects a black level of a signal of a light receiving pixel using the determined reference black level.

2. The signal processing device according to claim 1, wherein the lead integration unit integrates and averages the signals of the plurality of first light-shielded pixels in the first integration region while ignoring a signal exceeding an upper limit of the first integration region and ignoring a signal below a lower limit of the first integration region among the signals of the plurality of first light-shielded pixels, and the main integration unit integrates and averages the signals of the plurality of second light-shielded pixels in the second integration region while ignoring a signal exceeding an upper limit of the second integration region and ignoring a signal below a lower limit of the second integration region among the signals of the plurality of second light-shielded pixels.

3. The signal processing device according to claim 1, wherein
the lead integration unit integrates and averages the signals of the plurality of first light-shielded pixels in the first integration region while coordinating a signal exceeding an upper limit of the first integration region to the upper limit and coordinating a signal below a lower limit of the first integration region to the lower limit among the signals of the plurality of first light-shielded pixels, and
the main integration unit integrates and averages the signals of the plurality of second light-shielded pixels in the second integration region while coordinating a signal exceeding an upper limit of the second integration region to the upper limit and coordinating a signal below a lower limit of the second integration region to the lower limit among the signals of the plurality of second light-shielded pixels.

4. The signal processing device according to claim 1, wherein
the main integration unit determines a center level of the second integration region based on the result integrated and averaged by the lead integration unit.

5. The signal processing device according to claim 4, wherein
the main integration unit determines the second integration region such that a level width of the second integration region becomes narrower than a level width of the first integration region.

6. The signal processing device according to claim 5, wherein
the main integration unit determines the level width of the second integration region based on a result integrated and averaged by the lead integration unit.

7. The signal processing device according to claim 1, wherein
the lead integration unit integrates and averages the signals of the plurality of first light-shielded pixels for plural rounds.

8. The signal processing device according to claim 7, wherein
the main integration unit averages a plurality of results integrated and averaged by the lead integration unit and determines a center level of the second integration region based on an average value of the plurality of integrated and averaged results.

9. The signal processing device according to claim 8, wherein
the main integration unit determines the second integration region such that a level width of the second integration region becomes narrower than a level width of the first integration region.

10. The signal processing device according to claim 9, wherein
the main integration unit determines the level width of the second integration region based on a result integrated and averaged by the lead integration unit.

11. The signal processing device according to claim 1, wherein
the plurality of first light-shielded pixels and the plurality of second light-shielded pixels are arranged on a same row of the light-shielded area.

12. The signal processing device according to claim 1, wherein
a plurality of light-shielded pixels is arranged to define a plurality of rows in the light-shielded area, and the plurality of first light-shielded pixels and the plurality of second light-shielded pixels are arranged on different rows from each other in the light-shielded area.

13. The signal processing device according to claim 12, wherein
the plurality of first light-shielded pixels is arranged to define a plurality of rows.

14. The signal processing device according to claim 13, wherein
the lead integration unit integrates and averages the signals of the plurality of first light-shielded pixels for each of the plurality of rows, and
the main integration unit averages results of the plurality of rows integrated and averaged by the lead integration and determines a center level of the second integration region based on an average value of the integrated and averaged results.

15. The signal processing device according to claim 14, wherein
the main integration unit determines the second integration region such that a level width of the second integration region becomes narrower than a level width of the first integration region.

16. The signal processing device according to claim 15, wherein
the main integration determines the level width of the second integration region based on the results integrated and averaged by the lead integration unit.

17. The signal processing device according to claim 1, wherein
the imaging sensor further includes a second light-shielded area in which a plurality of third light-shielded pixels is arranged,
the imaging sensor outputs signals of the plurality of third light-shielded pixels in the second light-shielded area ahead of the signals of the plurality of first light-shielded pixels in the light-shielded area,
the signal processing device further comprises an adjustment unit that determines a clamp parameter based on the signals of the third light-shielded pixels in the second light-shielded area and adjusts the black level of the signal of the light receiving pixel based on the determined clamp parameter, and
the correction unit corrects the black level of the signal of the light receiving pixel, which has been adjusted by the adjustment unit using the determined reference black level.

18. The signal processing device according to claim 17, wherein
the adjustment unit adjusts, in analog, the black level of the signal of the light receiving pixel, and
the correction unit corrects, in digital, the black level of the signal of the light receiving pixel which has been adjusted by the adjustment unit.

19. The signal processing device according to claim 18, wherein
the adjustment unit generates a clamp parameter such that a black level of each of the signals of the plurality of third light-shielded pixels is brought closer to a second reference black level and supplies the generated clamp parameter to the imaging sensor, and
the imaging sensor clamps a signal to be output using the supplied clamp parameter.

20. An imaging system comprising:
an imaging sensor that includes a light receiving area in which a plurality of light receiving pixels is arranged and a light-shielded area in which a plurality of light-shielded pixels is arranged; and the image processing device according to claim 1 that processes a signal output from the imaging sensor.

\* \* \* \* \*